May 12, 1953   Z. W. MANN   2,638,430
METHOD OF MAKING SURFACE-COVERING ARTICLES
Filed July 6, 1950
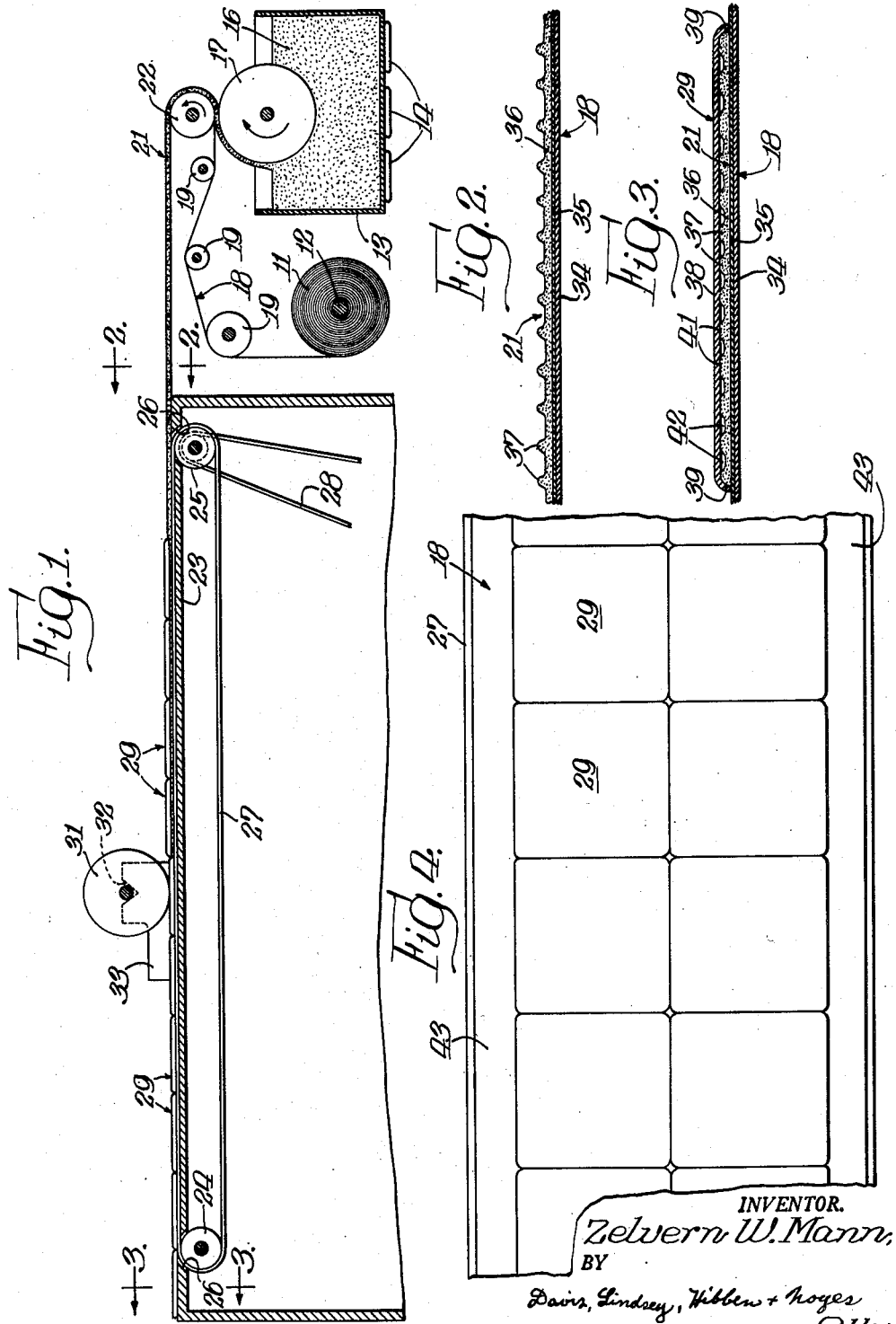
INVENTOR.
Zelvern W. Mann,
BY
Davis, Lindsey, Hibben + Noyes
Attys Patented May 12, 1953

2,638,430

UNITED STATES PATENT OFFICE 2,638,430

METHOD OF MAKING SURFACE-COVERING ARTICLES

Zelvern W. Mann, Chicago, Ill., assignor to The Meyercord Co., Chicago, Ill., a corporation of Illinois Application July 6, 1950, Serial No. 172,217

4 Claims. (Cl. 154—118)

This invention relates to a process or method for the manufacture of surface-covering articles such as wall tiles, decorative plaques for advertising or display purposes, and the like.

In my copending application Ser. No. 66,796 filed December 22, 1948, I have described and claimed a novel surface-covering article in the form of a wall tile or the like which can be quickly and easily installed by the average person without the need for special skill or experience and without the necessity of utilizing a separate cement or mastic.

The wall tile unit or similar surface-covering article described and claimed in my aforementioned prior application comprises a laminar structure in which the outermost layer is a generally flat, semi-rigid, surface-covering element such as a plastic tile. Disposed on the inner surface of this element is a relatively thick stratum or layer of a normally tacky mastic or pressure-sensitive adhesive material adapted to permanently bond the tile to a surface. A removable sealing or protective sheet is disposed over the exposed surface of the adhesive layer to protect the same prior to application of the tile to a surface. The tile element is preferably formed with inturned peripheral lips for retaining the adhesive layer on the tile and to permit sealing engagement of the protective sheet with the edges of the tile element. Also, the protective or sealing sheet is preferably in the form of a decalcomania backing paper having a water soluble gum or adhesive coating in order to permit the sealing sheet to be readily released from the tile merely by wetting. Upon removal of the protective sheet the exposed adhesive layer is pressed firmly against the wall or other surface in order to secure the tile thereon.

A primary object of the present invention is to provide a novel process for manufacturing surface-covering articles of the foregoing type including wall tiles, decorative or display plaques, and the like.

A further object of my invention is to provide a novel method for manufacturing surface-covering articles of the type described which is simple and economical in practice, which does not require the use of complex or special machinery, and which is well adapted for large scale continuous production.

An additional object of the invention is to provide a novel continuous method for assembling the several component elements of laminar surface-covering articles of the type described.

Another object of the invention is to provide a novel method for applying a pressure-sensitive adhesive and a protective sheet to surface-covering or facing elements such as wall tile and the like.

Still another object of the invention is to provide a novel continuous method for the production of surface-covering articles of the type described which, although involving certain manual operations, does not require any substantial degree of contact by the operators with the sticky adhesive material.

Other objects and advantages of the invention will become apparent from the subsequent detailed description taken in conjunction with the accompanying drawing wherein:

Fig. 1 is a fragmentary elevational view of one form of continuous apparatus for practicing my invention;

Fig. 2 is an enlarged fragmentary sectional view taken substantially along the line 2—2 of Fig. 1 and showing the surface-covering article at an intermediate stage in the process of manufacture;

Fig. 3 is an enlarged fragmentary sectional view taken substantially along the line 3—3 of Fig. 1 and showing the surface-covering article at a later stage in the process; and Fig. 4 is a fragmentary top plan view of a portion of the apparatus shown in Fig. 1.

Briefly, the process of my invention involves applying a layer of adhesive material of suitable thickness to a sheet of protective material, such as decalcomania backing paper, and subsequently pressing a tile or other similar surface-covering element into the adhesive-coated side of the sheet. As will appear hereinafter, I prefer to employ a roller-coating technique for coating a continuous strip of the protective sheet material and then successively pressing a plurality of tile elements into the adhesive-coated side of the moving strip. After the surface-covering elements have been pressed into position, the strip may be cut or otherwise severed between adjacent surface-covering elements in order to form completed units of the desired size.

Various attempts were made to produce surface-covering articles of the type here involved by filling individual tile elements with the required amount of adhesive and subsequently applying protective sheets to the adhesive-filled tiles. Such techniques were found to be slow, cumbersome, and generally unsatisfactory in that they were not readily adaptable to large scale commercial production of the surface-covering articles.

However, I have found that by first applying the adhesive to the protective sheet material and then covering the adhesive with the tile or other surface-covering element, I am able to assemble the articles rapidly and with a minimum of inconvenience. Thus, a sheet of decalcomania paper or the like may be provided with a quantity of adhesive by any suitable technique, e. g. by spreading the adhesive with a knife or spatula, by squeegeeing the adhesive through a stencil to provide an adhesive layer of predetermined size and contour, by screen printing, by nozzle-type dispensers, etc. Following the application of the adhesive, a tile element or the like is then pressed into engagement with the adhesive and the protective sheet to form the assembled article. As hereinafter explained, it is desirable to provide a plurality of grooves or channels in the outer surface of the adhesive layer in order to permit the escape of air during pressing of the tile element into place.

Although the present method may be used in batchwise fashion for assembling a single surface-covering article at a time, the method is particularly adapted to continuous operation for the production of a plurality of articles in a unitary process. The subsequent detailed description of the invention relates to such a continuous operation but it will be understood that the basic sequence of steps is not limited to continuous operation.

Referring now to the drawing, the arrangement of apparatus which is shown more or less diagrammatically in Fig. 1 has been found to be particularly advantageous in practicing my invention. A roll 11 of protective sheet material is carried on a rotatable bar or shaft 12 from which the sheet material unwinds and is fed outwardly during the process by suitable roll-driving means (not shown). This sheet material preferably comprises decalcomania backing paper having applied to one side thereof a releasable film, e. g. a coating of a water soluble gum or adhesive such as dextrin. A tank 13 having electric heating elements 14 at the bottom thereof is provided for maintaining a heated supply of a normally tacky pressure-sensitive adhesive material 16. A coating roller 17 is mounted adjacent the top of the tank 13 for picking up and transferring the adhesive material 16 to the backing paper 11.

From the roll 11 the protective sheet material extends in the form of an elongated strip 18 over a plurality of idling and tension-controlling rollers, as indicated at 19, and then passes into contact with the coating roller 17. As shown in Fig. 1, the passage of the strip 18 in contact with the coating roller 17 causes a layer 21 of the adhesive 16 to adhere to the strip, the adhesive being applied to the gum-coated side when the protective sheet material comprises decalcomania paper. It will be understood that for purposes of clarity the relative thickness of the adhesive layer 21 shown in Fig. 1 is exaggerated. The adhesive-coated strip 18 after contact with the coating roller 17 passes over a pulley or roller 22 and then moves horizontally in the opposite direction.

Disposed adjacent the coating machinery is an elongated bed or table 23 having a pair of spaced rolls 24 and 25 mounted at the opposite ends thereof and extending into complementary openings 26 in the bed 23. An endless conveyor belt 27 is provided between the rolls 24 and 25 with the upper half of the belt extending through the openings 26 and being supported flatwise on the bed 23. The roll 25 is connected to a suitable driving mechanism, shown only fragmentarily at 28, for operating the belt 27. The elongated strip 18 having the adhesive coating 21 at its upper surface extends over the upper half of the conveyor belt 27 which is supported by the bed 23 and the strip 18 is thereby continuously moved or fed to the left, as viewed in Fig. 1. As the coated paper strip is fed onto the bed 23, the tile elements, indicated at 29, are then placed manually against the adhesive layer 21 with only a slight amount of pressure sufficient to depress the peripheral rim portion or lips of the tiles 29 into the adhesive layer 21. The adhesive-coated strip having the tiles 29 positioned thereon then passes beneath a pressure-applying means comprising in this case a pressure roller 31 journaled in V-shaped grooves 32 in supporting blocks 33 at each side of the table. The relative height of the roller 31 above the belt 27 and the underlying bed 23 is adjusted so that the weight of the roller 31 will exert sufficient pressure on the upper surfaces of the tiles 29 to firmly press the latter into final position on the strip 18 with the rim portions of the tiles 29 in engagement with the paper strip 18. As seen clearly in Fig. 1 at the right of the roller 31, the tiles 29 extend only slightly into the adhesive stratum 21 prior to contact with the pressure roller 31, but after passage beneath the roller 31 the tiles 29 are pressed completely into the adhesive layer as indicated at the left of the roller 31 in Fig. 1.

Although, as previously explained, other techniques may be employed for coating the strip 18 with the adhesive material 16, I have found that the roller coating technique described herein is particularly desirable. With proper regulation of the consistency or viscosity of the adhesive material 16 in the tank 13, the layer 21 of pressure-sensitive adhesive is applied to the strip 18 with a characteristic grooved formation comprising a plurality of transversely-spaced longitudinally-extending ridges or elongated humps which project upwardly from the main body of the adhesive stratum. This phenomenon is illustrated in Fig. 2 which is an enlarged cross sectional view through the web or strip 18 as the latter leaves the coating roller 17, the relative thicknesses of the various layers being exaggerated for clarity. Thus, in Fig. 2 the strip 18 is shown as comprising a paper backing layer 34 having a water soluble gum coating 35, and the pressure-sensitive adhesive stratum 21 extends as a continuous unbroken coating over the gum-coated surface of the strip in a width sufficient to be covered subsequently by the tiles 29. The adhesive stratum 21 is formed with a relatively flat base portion, indicated at 36, and a plurality of transversely spaced ridges or humps 37 which extend along the length of the strip. Apparently, this ridge formation takes place as a result of partial adherence of the adhesive material 16 to the coating roller 17 as the strip 18 moves away from the coating roller.

For reasons hereinafter discussed, the ridges 37 in the adhesive layer 21 afford definite advantages both during the manufacture of the surface-covering articles and during their ultimate use. However, in order to insure this desirable ridge formation it is necessary to regulate the temperature of the body of pressure-sensitive adhesive 16 in the tank 13 whereby to provide the proper viscosity in the adhesive for obtaining ridge formation during the roller-coating operation and also the proper degree of thickness of the layer.

The exact temperature in any given case will, of course, depend on the composition and properties of the particular adhesive material being employed. In general, if the adhesive is too hot its viscosity or consistency is too thin with the result that the adhesive is "runny" and ridge formation is not realized during transfer of the adhesive from the roller 17 to the strip 18 or any ridges obtained tend to flatten out during passage of the strip from the roller 22 to the point of tile application. Moreover, under such conditions it is difficult to obtain an adhesive layer 21 of desired thickness on the strip 18 and a thin layer thereof would not sufficiently fill the tiles 29. On the other hand, if the temperature of the adhesive is too low its viscosity or consistency is too thick resulting in uneven and "stringy" application of the adhesive to the strip 18 and in a thicker layer than is required for the tiles.

For purposes of illustration, it has been found that a particularly satisfactory pressure-sensitive adhesive comprises a mixture of polyester and polyamide type resins, ethyl cellulose, a temperature-resistant filler and, if desired, a plasticizer and a suitable pigment. More specifically, the following adhesive formula has been used with a roller coating apparatus of the type herein described with excellent results:

| | Wt. per cent |
|---|---|
| Triethylene glycol ester of hydrogenated rosin (Staybellite Ester #3) | 56.5 |
| Octyl phenol | 0.1 |
| Ethyl cellulose | 5.3 |
| Polyamide resin comprising dimerized and trimerized unsaturated acids of vegetable oils with ethylene diamine (Polyamide 93) | 5.5 |
| Finely divided asbestos (Asbestine) | 31.0 |
| Titanium dioxide | 1.6 |

With the above formula a coating temperature of from about 220° F. to about 225° F. results in the desired ridge formation and a coating of the desired thickness as described above. Moreover, I have found that, contrary to what might be expected, the application of the adhesive 16 to the gum-coated paper strip 18 at such relatively elevated temperatures does not impair the water soluble film or gum and the film 35 retains its releasable qualities to permit removal of the sheet 18 during installation of the articles.

In Fig. 3 the adhesive layer 21 is shown after a tile 29 has been pressed into final position therein. Thus, a tile 29 having a flat body portion 38 and peripheral lip or rim portions 39 is pressed downwardly against the adhesive layer 21 until the edge of the rim 39 engages or seats against the gum-coated surface of the strip 18. As a result the ridges 37 are flattened, as indicated at 41, by contact with the body portion 38 of the tile and a plurality of air pockets in the form of grooves or channels 42 are retained between the flattened peaks or ridges. It will be understood that the total height of the ridges 37 above the paper strip 18 is slightly greater than the internal height of the rim 39 in order to obtain the flattening action of the body of the tile against the ridges 37 and thereby insure that the ridges of adhesive will be of the same internal height as the tile rim. However, the total inner height of the rim 39 is greater than the thickness of the flat portion 36 of the adhesive layer 21 so that the voids or air channels 42 are retained after the tiles are in place.

The characteristic formation of the ridges 37 and intervening grooves 42 in the adhesive layer 21 is a marked advantage during the process of manufacturing the surface-covering articles because of the reduced amount of adhesive required and because of the lighter weight of the final article for sale and shipment. In addition, when the tiles 29 are pressed downwardly into the adhesive coating 21 the continuous grooves 42 between the ridges 37 permit air to escape from under the edges of the tiles 29 as the latter are pressed into the adhesive and when the rim portions 39 of the tiles are in final position abutting the strip 18 adequate space is still provided in the enclosed pockets 42 for slight displacement or compression of air which may be trapped beneath the individual tiles. If the adhesive layer 21 were formed as a continuous layer of substantially uniform thickness, it will be seen that a serious problem of air displacement and consequent resistance would result during pressing of the tiles 29 into final position. However, by means of the ridge formation in the adhesive stratum there is sufficient empty space unfilled by adhesive to permit air to escape when the tile is being pressed into position and to permit any trapped air to be slightly compressed between the adhesive layer and the superimposed tile element. The existence of longitudinal pockets of slightly compressed air on opposite sides of the ridges 37 is also believed to assist in maintaining the ridge formation during the manufacture of the articles and during the subsequent period prior to use of the articles.

The ridge formation which exists in the completed article, as shown in Fig. 3, also affords another advantage in that when the protective sheet 18 having the water soluble gum coating 35 is removed immediately prior to use of the article, the voids 42 permit the adhesive to be displaced or shifted within the tile 29 in order that the adhesive stratum may conform readily to surface irregularities in the wall or other surface to which the article is being applied. For example, if there is an outward bulge or bump in a wall to which it is desired to apply one of the present surface-covering articles, it will be seen that when the exposed adhesive layer is pressed against the wall over such bulge, the adhesive 21 within the tile 29 will be displaced slightly to receive the bulged portion of the wall. The provision of the pocket 42 facilitates and readily permits such displacement of the adhesive during installation of the tile.

In Fig. 4 the general arrangement of the tiles on the continuous adhesive-coated strip 18 is shown in which the tiles 29 have been placed in double rows with the tiles in close contact with each other. It will be understood that in such an arrangement the width of the adhesive layer 21 underlying the tiles 29 is approximately the width of two of the tile members 29 so that there is an appreciable longitudinal margin 43 of coated paper 18 on each side of the row of double tiles in order to facilitate handling of the same. As the completed tiles are fed off of the work table or bed 23, the tiles may be divided or severed into separate units merely by cutting the strip 18 crosswise between adjacent pairs of tiles 29. Thus, for example an operator may manually cut the continuous strip of finished surface-covering articles into blocks of two, four, or any other desired number of units, or individual tile units may be formed by cutting the strip 18 around all sides of the tiles 29.

I claim:

1. A process for the manufacture of an article of the type described including a tile member having a generally flat body portion with preformed peripheral lip portions extending outwardly from the plane of said body portion to define an adhesive-receiving recess at one side of said member, said process comprising the steps of coating a sheet of backing material with an adhesive layer, and pressing said tile member into the adhesive coated side of said sheet until the edges of said lip portions engage said backing sheet whereby said recess is substantially filled with an adhesive layer having a thickness extending from the body portion of said tile member substantially to the outer edges of said lip portions.

2. A continuous process for the manufacture of articles of the type described each including a tile member having a generally flat body portion with preformed peripheral lip portions extending outwardly from the plane of said body portion to define an adhesive-receiving recess at one side of said member, said process comprising the steps of continuously coating one side of a strip of backing material with an adhesive layer, placing a plurality of said tile members in predetermined position on the adhesive coated side of said strip, continuously passing said strip with the tile members in place thereon in contact with a pressure-applying means and thereby pressing the tile members into said adhesive layer until the edges of the lip portions engage said strip whereby the recesses of the tile members are each substantially filled with an adhesive layer having a thickness extending from the body of the tile member substantially to the outer edges of the lip portions thereof.

3. The process of claim 2 further characterized in that after said tile members have been pressed into the adhesive coated side of said strip, the strip is then cut between adjacent tile members to form a plurality of separate articles.

4. A process for the manufacture of an article of the type described including a tile member having a generally flat body portion with preformed peripheral lip portions extending outwardly from the plane of said body portion to define an adhesive-receiving recess at one side of said member, said process comprising the steps of applying to a sheet of backing material an adhesive layer having a plurality of upstanding ridges and intervening depressions, and pressing said tile member into the adhesive coated side of said sheet until the edges of said lip portions engage said backing sheet and said ridges are engaged by the body portion of said tile member whereby said recess is substantially filled with an adhesive layer having a thickness extending from said body portion substantially to the outer edges of said lip portions and having a plurality of confined air pockets intermediate said ridges.

ZELVERN W. MANN.

References Cited in the file of this patent

UNITED STATES PATENTS

| Number | Name | Date |
|---|---|---|
| 334,300 | Sochefsky | Jan. 12, 1886 |
| 868,157 | Bishopric | Oct. 15, 1907 |
| 2,054,448 | Russell | Sept. 15, 1936 |
| 2,135,473 | Russell | Nov. 1, 1938 |
| 2,145,068 | Batcheller | Jan. 24, 1939 |
| 2,304,787 | Avery | Dec. 15, 1942 |
| 2,391,539 | Avery | Dec. 25, 1945 |